US012794214B2

(12) United States Patent
Wang et al.

(10) Patent No.: US 12,794,214 B2
(45) Date of Patent: Nov. 10, 2026

(54) OVERCURRENT PROTECTION APPARATUS AND PROTECTION METHOD FOR T-TYPE THREE-LEVEL INVERTER

(71) Applicant: SolaX Power Network Technology (Zhejiang) Co., Ltd., Hangzhou (CN)

(72) Inventors: Kerou Wang, Hangzhou (CN); Qikang Wei, Hangzhou (CN); Tao Gu, Hangzhou (CN)

(73) Assignee: SolaX Power Network Technology (Zhejiang) Co., Ltd., Hangzhou (CN)

( * ) Notice: Subject to any disclaimer, the term of this patent is extended or adjusted under 35 U.S.C. 154(b) by 191 days.

(21) Appl. No.: 18/843,445

(22) PCT Filed: Jun. 10, 2022

(86) PCT No.: PCT/CN2022/098117
§ 371 (c)(1),
(2) Date: Sep. 3, 2024

(87) PCT Pub. No.: WO2023/165047
PCT Pub. Date: Sep. 7, 2023

(65) Prior Publication Data
US 2025/0174978 A1 May 29, 2025

(30) Foreign Application Priority Data
Mar. 3, 2022 (CN) ......................... 202210201802.3

(51) Int. Cl.
*H02M 7/483* (2007.01)
*H02H 3/027* (2006.01)
(Continued)

(52) U.S. Cl.
CPC ............ *H02H 3/093* (2013.01); *H02H 3/027* (2013.01); *H02H 3/083* (2013.01); *H02H 7/122* (2013.01); *H02M 7/483* (2013.01)

(58) Field of Classification Search
CPC ........ H02H 3/093; H02H 3/027; H02H 3/083; H02H 7/122; H02M 7/483
See application file for complete search history.

(56) References Cited

U.S. PATENT DOCUMENTS 6,995,994 B2 * 2/2006 Bijlenga ............ H02M 7/4826 363/51

FOREIGN PATENT DOCUMENTS

CN 203151454 U 8/2013
CN 103944148 A 7/2014
(Continued)

*Primary Examiner* — Gary L Laxton
(74) *Attorney, Agent, or Firm* — ScienBiziP, P.C.

(57) ABSTRACT

Provided are an overcurrent protection apparatus and protection method for a T-type three-level inverter, the overcurrent protection apparatus comprising a T-type three-level inverter circuit, an overcurrent protection circuit and a switch transistor driving unit, the output end of the T-type three-level inverter circuit being connected to the overcurrent protection circuit, the overcurrent protection circuit being connected to the switch transistor driving unit, and the switch transistor driving unit being connected to transverse transistors and vertical transistors of the T-type three-level inverter circuit. The overcurrent protection apparatus is characterized in that the overcurrent protection unit comprises a delay unit; the delay unit is used for carrying out delay processing on an overcurrent signal and then outputting a delayed overcurrent signal; the overcurrent protection circuit respectively controls on and off of the transverse transistors and of the vertical transistors by means of the overcurrent signal and the delayed overcurrent signal. When the T-type three-level inverter is subjected to overcurrent protection, current is firstly diverted from a vertical transistor to the transverse transistors, and after a certain delay, the current is diverted from the transverse transistors to a switch transistor of another vertical transistor, thereby effectively
(Continued)

reducing VDS voltage stress of switch transistors of the inverter, and avoiding a failure and damage of devices.

9 Claims, 2 Drawing Sheets

(51) Int. Cl.
*H02H 3/08* (2006.01)
*H02H 3/093* (2006.01)
*H02H 7/122* (2006.01)

(56) References Cited

FOREIGN PATENT DOCUMENTS

| | | | |
|---|---|---|---|
| CN | 104377659 | A | 2/2015 |
| CN | 110581643 | A | 12/2019 |
| CN | 209913489 | U | 1/2020 |
| CN | 110739873 | B | 8/2020 |
| CN | 114024436 | A | 2/2022 |
| CN | 114583658 | A | 6/2022 |
| JP | 2009296732 | A | 12/2009 |

* cited by examiner

OVERCURRENT PROTECTION APPARATUS AND PROTECTION METHOD FOR T-TYPE THREE-LEVEL INVERTER

TECHNICAL FIELD

The present disclosure relates to electronic circuit technology field, in particular to an overcurrent protection apparatus and a protection method for T-type three-level inverter.

BACKGROUND

A T-type three-level circuit has advantages of simple control, high reliability, easy device selection, etc., and is a common circuit for three-phase photovoltaic inverters.

At present, most T-type three-level inverters on the market adopt the over-current protection mode of turning off all switching tubes at the same time when AC side overcurrent protection occurs. If the T-type three-level circuit closes all the switching tubes of the inverter at the same time, the large current on the AC side is commutated from the standpipe switching tube to an inverse diode of the other standpipe switching tube, and the current is drawn from the busbar, which is easy to cause the VDS voltage of the switching tube to peak and exceed the maximum VDS withstand voltage stress, resulting in its failure.

SUMMARY OF THE INVENTION

The application provides an overcurrent protection apparatus and a protection method for T-type three-level inverter to solve the technical problem that if the T-type three-level circuit closes all the switching tubes of the inverter at the same time, it is easy to cause the VDS voltage of the switching tube to peak and exceed the VDS maximum withstand voltage stress, resulting in its failure.

To solve the above technical problem, a specific technical scheme of the present invention the overcurrent protection apparatus and a protection method for T-type three-level inverter of the present invention is as follows:

An overcurrent protection apparatus for T-type three-level inverter including a T-type three-level inverter circuit, an overcurrent protection circuit, and a switch tube driver unit; an output end of the T-type three-level inverter circuit connected to the overcurrent protection circuit, the overcurrent protection circuit connected to the switch tube driver unit, the switch tube driver unit connected to horizontal transistors and vertical transistors of the T-type three-level inverter circuit; wherein the overcurrent protection circuit comprises a delay unit, the delay unit is configured to perform a delay process to an overcurrent signal and then output an overcurrent delay signal, the overcurrent protection circuit controls a turn-off of the horizontal transistors and the vertical transistors through the overcurrent signal and the overcurrent delay signal.

Further, the overcurrent protection circuit comprises an AC side current detection unit, an overcurrent determination unit, the delay unit, and a DSP unit; the output end of the T-type three-level inverter circuit is connected to the AC side current detection unit, the AC side current detection unit is connected to the overcurrent determination unit, the overcurrent determination unit is connected to the delay unit and an IO1 port of the DSP unit, the delay unit is connected to an IO2 port of the DSP unit; the DSP unit is connected to the switch tube driver unit;

the AC side current detection unit is configured to detect an AC side current of the T-type three-level inverter circuit in real time; the overcurrent determination unit is configured to determine whether the T-type three-level inverter circuit has overcurrent and output the overcurrent signal;

the DSP unit is configured to receive the overcurrent signal and the overcurrent delay signal and transmit a corresponding instruction to the switch tube driver unit according to the overcurrent signal and the overcurrent delay signal;

the switch tube driver unit controls the turn-off the vertical transistors and the horizontal transistors of the T-type three-level inverter circuit according to the instruction of the DSP unit.

Further, the delay unit is consisted of two resistors R1, R2, a capacitor C1, and a diode D1, an output end of the overcurrent signal is connected to a negative electrode of the diode D1, a positive electrode of the diode D1 is connected to an end of the resistor R1, another end of the resistor R1 is connected to an end of the resistor R2, an end of the capacitor C1 is connected to an output end of the overcurrent delay signal, another end of the resistor R2 is connected to a power source VCC, another end of the capacitor C1 is grounded.

Further, a size of a delay time of the delay unit is determined by a RC delay link consisting of the resistor R1 and the capacitor C1.

Further, the overcurrent determination unit is consisted of resistors R3-R7 and comparators U1, U2, I_AC_Sample is a current sampling signal of the AC side current detection unit, ref+ and ref− are an upper limit and a lower limit of overcurrent determination respectively, which are obtained by dividing voltage of the power source VCC through resistors R3, R4, R5, R6, when the current sampling signal is less than the lower limit or greater than the upper limit, the current sampling signal will trigger the comparators U1, U2 to flip over, causing the overcurrent signal to be pulled to a low level.

The present invention further discloses an overcurrent protection method for T-type three-level inverter, comprising following steps:

step 1: configuring DSP: configuring the IO1 port and the IO2 port of the DSP unit, the IO1 port and the IO2 port are any two DSP IO ports configured with a TZ function, configuring the IO1 port with the TZ function, which corresponds to all PWM signals of the vertical transistors of the T-type three-level inverter circuit, configuring the IO2 port with the TZ function, which corresponds to all PWM signals of the horizontal transistors of the T-type three-level inverter circuit;

step 2: the AC side current detection unit detects an AC side current of the T-type three-level inverter circuit in real time;

step 3: the overcurrent determination unit determines whether an overcurrent occurs in the T-type three-level inverter circuit, if an overcurrent signal TZ1 is generated, outputting the overcurrent signal TZ1 and entering step 4;

step 4: the delay unit performs the delay process to the overcurrent signal TZ1 and outputs an overcurrent delay signal TZ2;

step 5: the DSP unit receives the overcurrent signal TZ1 and the overcurrent delay signal TZ2 and transmits a corresponding instruction to the switch tube driver unit according to the overcurrent signal TZ1 and the overcurrent delay signal TZ2;

step 6: the switch tube driver unit controls a turn-off of the horizontal transistors and the vertical transistors of the T-type three-level inverter circuit respectively according to the instruction of the DSP unit.

Further, when the IO1 port receives a low level signal TZ1, setting all the PWM signals of the vertical transistors of the T-type three-level inverter circuit to low, and locking a state of the vertical transistors; when the IO2 port receives a low level signal TZ2, setting all the PWM signals of the horizontal transistors of the T-type three-level inverter circuit to low, and locking a state of the horizontal transistors.

Further, if a current of an A-phase vertical transistor Q1A occurs overcurrent, setting an output signal TZ1 of the overcurrent determination unit to low, and the signal TZ1 is received by the IO1 port of the DSP unit, the DSP unit transmits the instruction to the switch tube driver unit, the switch tube driver unit immediately outputs the instruction to set PWM driving signals of vertical transistors Q1A, Q2A to low, maintains original states of PWM driving signals of horizontal transistors Q3A, Q4A, and the current is commutated from the vertical transistor Q1A to the horizontal transistors Q3A, Q4A.

Further, when the signal TZ1 becomes low level, the signal TZ2 is also pulled to low level after a fixed delay time of the delay unit, at this time, the DSP unit receives the signal TZ2 becoming low, the DSP unit transmits the instruction to the switch tube driver unit, the switch tube driver unit immediately sets the PWM driving signals of the horizontal transistors Q3A, Q4A output by itself to low, and the current is commutated from the horizontal transistors Q3A, Q4A to an anti-parallel diode of the other vertical transistors Q2A.

Further, after the overcurrent protection process executed, the DSP unit locks the low PWM signals, maintain the low level, and unlock an PWM signal output after detecting that an abnormal recovery condition is met.

The overcurrent protection device and protection method for T-type three-level inverter have the following advantages: when the overcurrent protection occurs in the T-type three-level inverter, the current is first commutated from the vertical transistors to the horizontal transistors, and after a certain delay, the current is then commutated from the horizontal transistors to the switch tube of another vertical transistor, compared with directly switching off all the switch tubes, the method can effectively reduce the VDS voltage stress of the inverter switch tube and avoid device failure and damage. And the circuit and method only need to add delay unit and DSP configuration in the original common overcurrent protection circuit and method, the method is simple, low cost, and high reliability.

DETAILED DESCRIPTION

In order to better understand the purpose, structure and function of the invention, the overcurrent protection device and the protection method of T-type three-level inverter of the invention are further described in detail in combination with the attached drawings.

Figure 1:
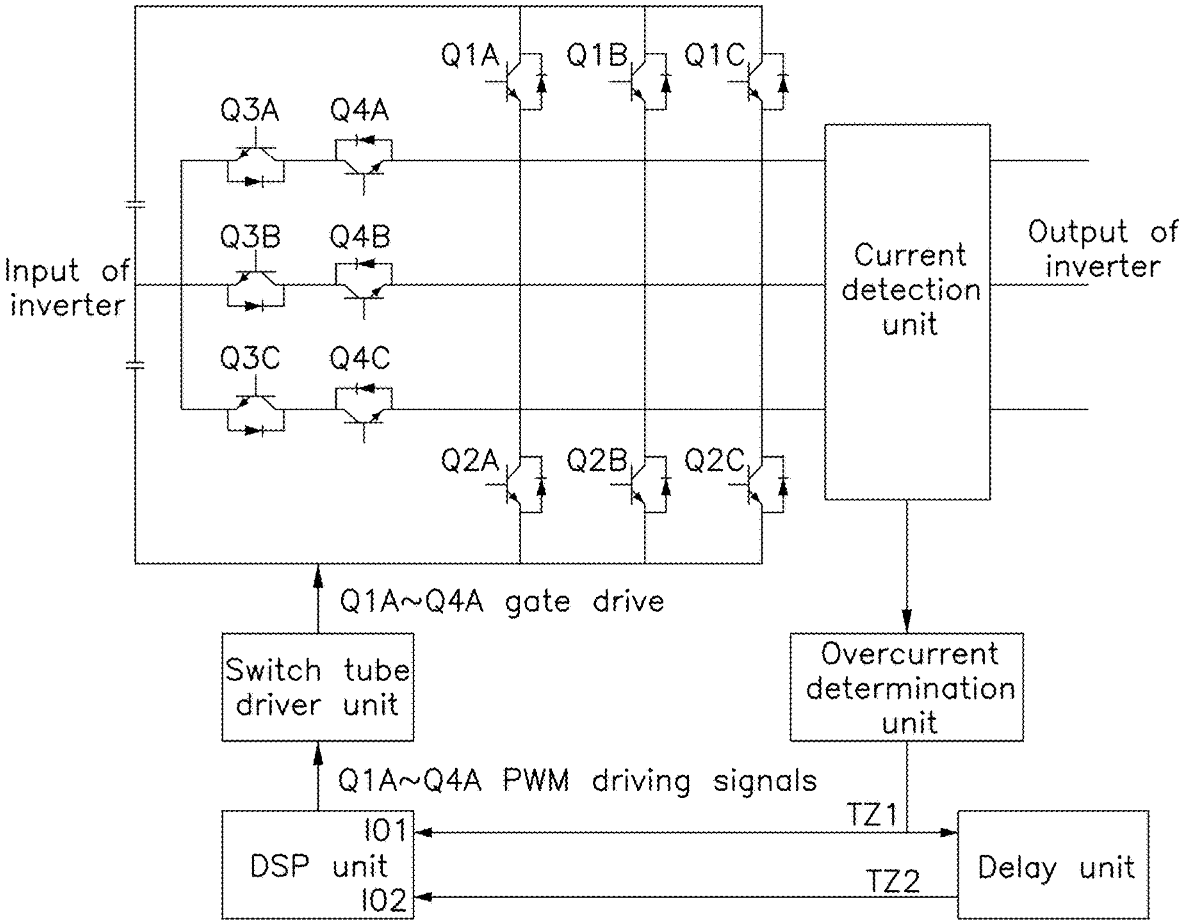
FIG. 1 is a block diagram of an overcurrent protection apparatus for T-type three-level inverter of the present invention.

As shown in FIG. 1, the overcurrent protection apparatus for T-type three-level inverter of the invention includes a T-type three-level inverter circuit, an overcurrent protection circuit, and a switch tube driver unit. An output end of the T-type three-level inverter circuit is connected to the overcurrent protection circuit, the overcurrent protection circuit is connected to the switch tube driver unit, the switch tube driver unit is connected to horizontal transistors and vertical transistors of the T-type three-level inverter circuit. The overcurrent protection circuit includes an AC side current detection unit, an overcurrent determination unit, a delay unit, and a DSP unit. The output end of the T-type three-level inverter circuit is connected to the AC side current detection unit, the AC side current detection unit is connected to the overcurrent determination unit, the overcurrent determination unit is connected to the delay unit and an IO1 port of the DSP unit, the delay unit is connected to an IO2 port of the DSP unit; the DSP unit is connected to the switch tube driver unit. The AC side current detection unit is used to detect an AC side current of the T-type three-level inverter circuit in real time; the overcurrent determination unit is used to determine whether the T-type three-level inverter circuit has overcurrent and output an overcurrent signal; the delay unit is used to perform a delay process to the overcurrent signal and then output an overcurrent delay signal; the DSP unit is used to receive the overcurrent signal and the overcurrent delay signal and transmit a corresponding instruction to the switch tube driver unit according to the signals; the switch tube driver unit can turn off the vertical transistors and the horizontal transistors of the T-type three-level inverter circuit according to the instruction of the DSP unit.

When the inverter is running normally connected to the grid, the AC side current detection unit detects the AC side current in real time, and determines whether overcurrent occurs through the overcurrent determination unit, if overcurrent occurs, the overcurrent determination unit outputs a low level signal TZ1 to a function port IO1 of the DSP unit, meanwhile the delay unit generates a low level signal TZ2 according to the signal TZ1 and outputs same to another function port 102 of the DSP unit. Pre-configuring the DSP, so that when the IO1 of the DSP unit receives the signal TZ1, the DSP unit transmits the instruction to switch tube driver unit to close all the vertical transistors of T-type three-level inverter circuit, when the IO2 of the DSP unit receives the signal TZ2, the DSP unit transmits the instruction to switch tube driver unit to close all the horizontal transistors of T-type three-level inverter circuit.

Figure 2:
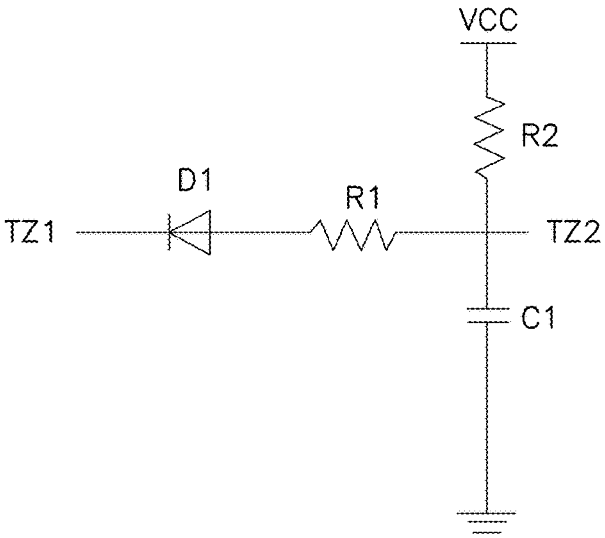
FIG. 2 is a circuit diagram of a delay unit of the present invention.

As shown in FIG. 2, the delay unit is consisted of two resistors R1, R2, a capacitor C1, and a diode D1, an output end of the signal TZ1 is connected to a negative electrode of the diode D1, a positive electrode of the diode D1 is connected to an end of the resistor R1, another end of the resistor R1 is connected to an end of the resistor R2, an end of the capacitor C1 is connected to an output end of the signal TZ2, another end of the resistor R2 is connected to a power source VCC, another end of the capacitor C1 is grounded.

Figure 3:
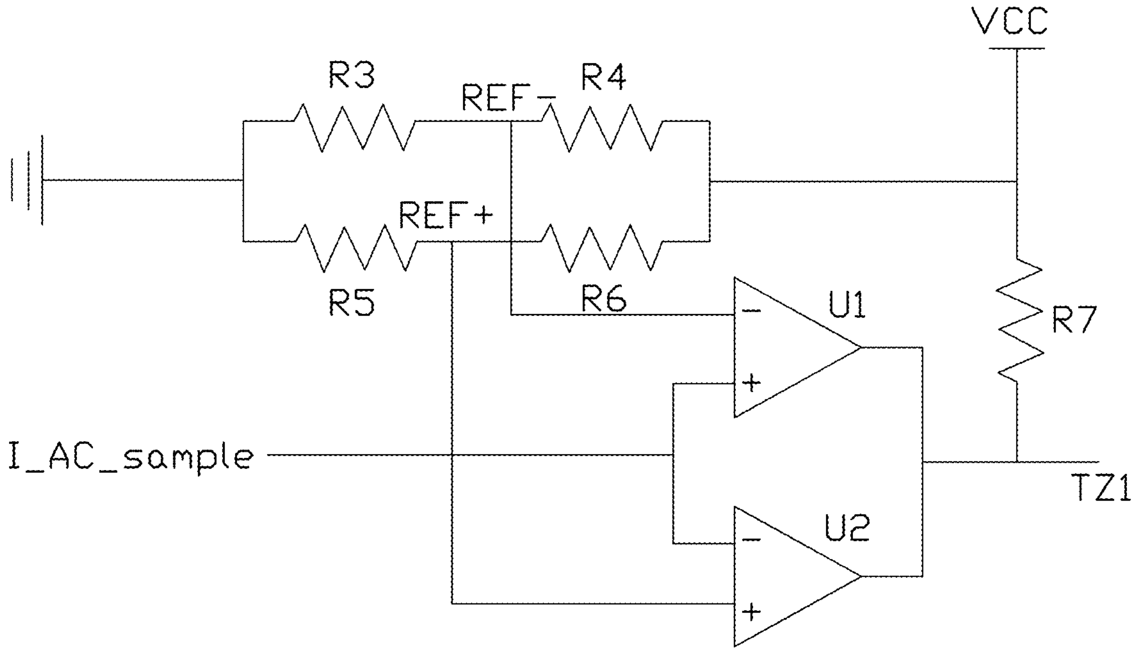
FIG. 3 is a circuit diagram of an overcurrent determination unit of the present invention.

FIG. 3 illustrates a form of the overcurrent determination unit, which is consisted of resistors R3-R7 and comparators U1, U2, I_AC_Sample is a current sampling signal of the AC side current detection unit, ref+ and ref− are an upper limit and a lower limit of overcurrent determination respectively, which are obtained by dividing voltage of the VCC through the resistors R3, R4, R5 and R6. When the current sampling signal is less than the lower limit or greater than the upper limit, it will trigger the comparators U1, U2 to flip over, causing the signal TZ1 to be pulled to the low level.

Pre-configuring the DSP according to table 1, IO1 and IO2 are any two DSP IOs that can be configured with TZ function, IO1 is configured with the TZ function, which corresponds to all vertical transistor PWM signals of the T-type three-level inverter circuit, IO2 is configured with the TZ function, which corresponds to all horizontal transistor PWM signals of the T-type three-level inverter circuit, when IO1 receives the low level signal TZ1, all the PWM signals of the vertical transistors of the T-type three-level inverter circuit are set to low and locked. When IO2 receives the low level signal TZ2, all the PWM signals of the horizontal transistors of the T-type three-level inverter circuit are set to low and locked.

TABLE 1

| DSP configuration mode | | |
|---|---|---|
| | Configuration function | Configuring corresponding PWM signals |
| IO1 | TZ-set low | PWMQ1A PWMQ2A PWMQ1B PWMQ2B PWMQ1C PWMQ2C |
| IO2 | TZ-set low | PWMQ3A PWMQ4A PWMQ3B PWMQ4B PWMQ3C PWMQ4C |

Take A-phase as an example, assuming that the T-type three-level inverter circuit is working in a grid-connected state, the current of the A-phase vertical transistor Q1A overcurrent occurs, so the output signal TZ1 of the overcurrent determination unit is set to low, and the signal TZ1 is received by the IO1 function port of the DSP unit, the DSP unit transmits the instruction to the switch tube driver unit, the switch tube driver unit immediately outputs the instruction to set PWM driving signals of vertical transistors Q1A and Q2A to low, maintains original states of PWM driving signals of horizontal transistors Q3A and Q4A, and the current is commutated from the vertical transistor Q1A to the horizontal transistors Q3A and Q4A.

When the TZ1 becomes low level, the TZ2 will also be pulled to low level after a fixed delay time of the delay unit, a size of the fixed delay time is determined by a RC delay link consisting of R1 and C1. At this time, the DSP unit receives the signal TZ2 becoming low, the DSP unit transmits the instruction to the switch tube driver unit, the switch tube driver unit immediately sets the PWM driving signals of the horizontal transistors Q3A and Q4A output by itself to low, and the current is commutated from the horizontal transistors Q3A and Q4A to an anti-parallel diode of the other vertical transistors Q2A.

After the above overcurrent protection process executed, the DSP unit will lock the low PWM signals, maintain the low level, and unlock the PWM signal output after it detects that an abnormal recovery condition is met, an abnormal release condition depends on a specific situation of the T-type three-level inverter circuit.

When there is no overcurrent abnormal in the inverter, the output end of the comparator in the overcurrent determination unit is in a high resistance state, the signal TZ1 is pulled to a high level by a pull-up resistor, and the output signal TZ2 of the delay circuit unit is also pulled to a high level by the pull-up resistor R2, TZ of the DSP unit will not be triggered, the DSP unit normally controls its PWM driving signal according to the working state of the T-type three-level inverter circuit.

It is understood that the present invention is described by embodiments which, to the knowledge of those skilled in the art, may be variously altered or equivalently replaced without deviating from the spirit and scope of the present invention. In addition, under the instruction of the present invention, these features and embodiments may be modified to suit specific situations and materials without deviating from the spirit and scope of the present invention. Therefore, the invention is not limited by the specific embodiments disclosed herein, and all embodiments falling within the scope of the claims of the present application fall within the scope protected by the invention.

The invention claimed is:

1. An overcurrent protection apparatus for T-type three-level inverter comprising a T-type three-level inverter circuit, an overcurrent protection circuit, and a switch tube driver unit; an output end of the T-type three-level inverter circuit connected to the overcurrent protection circuit, the overcurrent protection circuit connected to the switch tube driver unit, the switch tube driver unit connected to horizontal transistors and vertical transistors of the T-type three-level inverter circuit; wherein the overcurrent protection circuit comprises a delay unit, the delay unit is configured to perform a delay process to an overcurrent signal and then output an overcurrent delay signal, the overcurrent protection circuit controls a turn-off of the horizontal transistors and the vertical transistors through the overcurrent signal and the overcurrent delay signal;

the overcurrent protection circuit comprises an AC side current detection unit, an overcurrent determination unit, the delay unit, and a DSP unit; the output end of the T-type three-level inverter circuit is connected to the AC side current detection unit, the AC side current detection unit is connected to the overcurrent determination unit, the overcurrent determination unit is connected to the delay unit and an IO1 port of the DSP unit, the delay unit is connected to an IO2 port of the DSP unit; the DSP unit is connected to the switch tube driver unit;

the AC side current detection unit is configured to detect an AC side current of the T-type three-level inverter circuit in real time; the overcurrent determination unit is configured to determine whether the T-type three-level inverter circuit has overcurrent and output the overcurrent signal;

the DSP unit is configured to receive the overcurrent signal and the overcurrent delay signal and transmit a corresponding instruction to the switch tube driver unit according to the overcurrent signal and the overcurrent delay signal;

the switch tube driver unit controls turn-off of the vertical transistors and the horizontal transistors of the T-type three-level inverter circuit according to the instruction of the DSP unit.

2. The overcurrent protection apparatus for T-type three-level inverter according to claim 1, wherein the delay unit consists of two resistors (R1, R2), a capacitor (C1), and a diode (D1), an output end of the overcurrent signal is connected to a negative electrode of the diode (D1), a positive electrode of the diode (D1) is connected to an end of the resistor (R1), another end of the resistor (R1) is connected to an end of the resistor (R2), an end of the capacitor (C1) is connected to an output end of the overcurrent delay signal, another end of the resistor (R2) is connected to a power source (VCC), another end of the capacitor (C1) is grounded.

3. The overcurrent protection apparatus for T-type three-level inverter according to claim 2, wherein a size of a delay time of the delay unit is determined by a RC delay link consisting of the resistor (R1) and the capacitor (C1).

4. The overcurrent protection apparatus for T-type three-level inverter according to claim 1, wherein the overcurrent determination unit consists of resistors (R3-R7) and comparators (U1, U2), I_AC_Sample is a current sampling signal of the AC side current detection unit, ref+ and ref− are an upper limit and a lower limit of overcurrent determination respectively, which are obtained by dividing voltage of the power source (VCC) through resistors (R3, R4, R5, R6), when the current sampling signal is less than the lower limit or greater than the upper limit, the current sampling signal will trigger the comparators (U1, U2) to flip over, causing the overcurrent signal to be pulled to a low level.

5. An overcurrent protection method for T-type three-level inverter using the overcurrent protection apparatus for T-type three-level inverter according to claim 1, comprising following steps:

step 1: configuring DSP: configuring the IO1 port and the IO2 port of the DSP unit, the IO1 port and the IO2 port are any two DSP IO ports configured with a TZ function, configuring the IO1 port with the TZ function, which corresponds to all PWM signals of the vertical transistors of the T-type three-level inverter circuit, configuring the IO2 port with the TZ function, which corresponds to all PWM signals of the horizontal transistors of the T-type three-level inverter circuit;

step 2: the AC side current detection unit detects an AC side current of the T-type three-level inverter circuit in real time;

step 3: the overcurrent determination unit determines whether an overcurrent occurs in the T-type three-level inverter circuit, if an overcurrent signal (TZ1) is generated, outputting the overcurrent signal (TZ1) and entering step 4;

step 4: the delay unit performs the delay process to the overcurrent signal (TZ1) and outputs an overcurrent delay signal (TZ2);

step 5: the DSP unit receives the overcurrent signal (TZ1) and the overcurrent delay signal (TZ2) and transmits a corresponding instruction to the switch tube driver unit according to the overcurrent signal (TZ1) and the overcurrent delay signal (TZ2);

step 6: the switch tube driver unit controls a turn-off of the horizontal transistors and the vertical transistors of the T-type three-level inverter circuit respectively according to the instruction of the DSP unit.

6. The overcurrent protection method for T-type three-level inverter according to claim 5, wherein when the IO1 port receives a low level signal (TZ1), setting all the PWM signals of the vertical transistors of the T-type three-level inverter circuit to low, and locking a state of the vertical transistors; when the IO2 port receives a low level signal (TZ2), setting all the PWM signals of the horizontal transistors of the T-type three-level inverter circuit to low, and locking a state of the horizontal transistors.

7. The overcurrent protection method for T-type three-level inverter according to claim 5, wherein if a current of an A-phase vertical transistor (Q1A) occurs overcurrent, setting an output signal (TZ1) of the overcurrent determination unit to low, and the signal (TZ1) is received by the IO1 port of the DSP unit, the DSP unit transmits the instruction to the switch tube driver unit, the switch tube driver unit immediately outputs the instruction to set PWM driving signals of vertical transistors (Q1A, Q2A) to low, maintains original states of PWM driving signals of horizontal transistors (Q3A, Q4A), and the current is commutated from the vertical transistor (Q1A) to the horizontal transistors (Q3A, Q4A).

8. The overcurrent protection method for T-type three-level inverter according to claim 7, wherein when the signal (TZ1) becomes low level, the signal (TZ2) is also pulled to low level after a fixed delay time of the delay unit, at this time, the DSP unit receives the signal (TZ2) becoming low, the DSP unit transmits the instruction to the switch tube driver unit, the switch tube driver unit immediately sets the PWM driving signals of the horizontal transistors (Q3A, Q4A) output by itself to low, and the current is commutated from the horizontal transistors (Q3A, Q4A) to an anti-parallel diode of the other vertical transistors (Q2A).

9. The overcurrent protection method for T-type three-level inverter according to claim 8, wherein after the overcurrent protection process executed, the DSP unit locks the low PWM signals, maintain the low level, and unlock an PWM signal output after detecting that an abnormal recovery condition is met.

* * * * *